May 27, 1941.  J. G. CLARK  2,243,192
MANURE DEHYDRATOR
Filed June 28, 1939  2 Sheets-Sheet 1
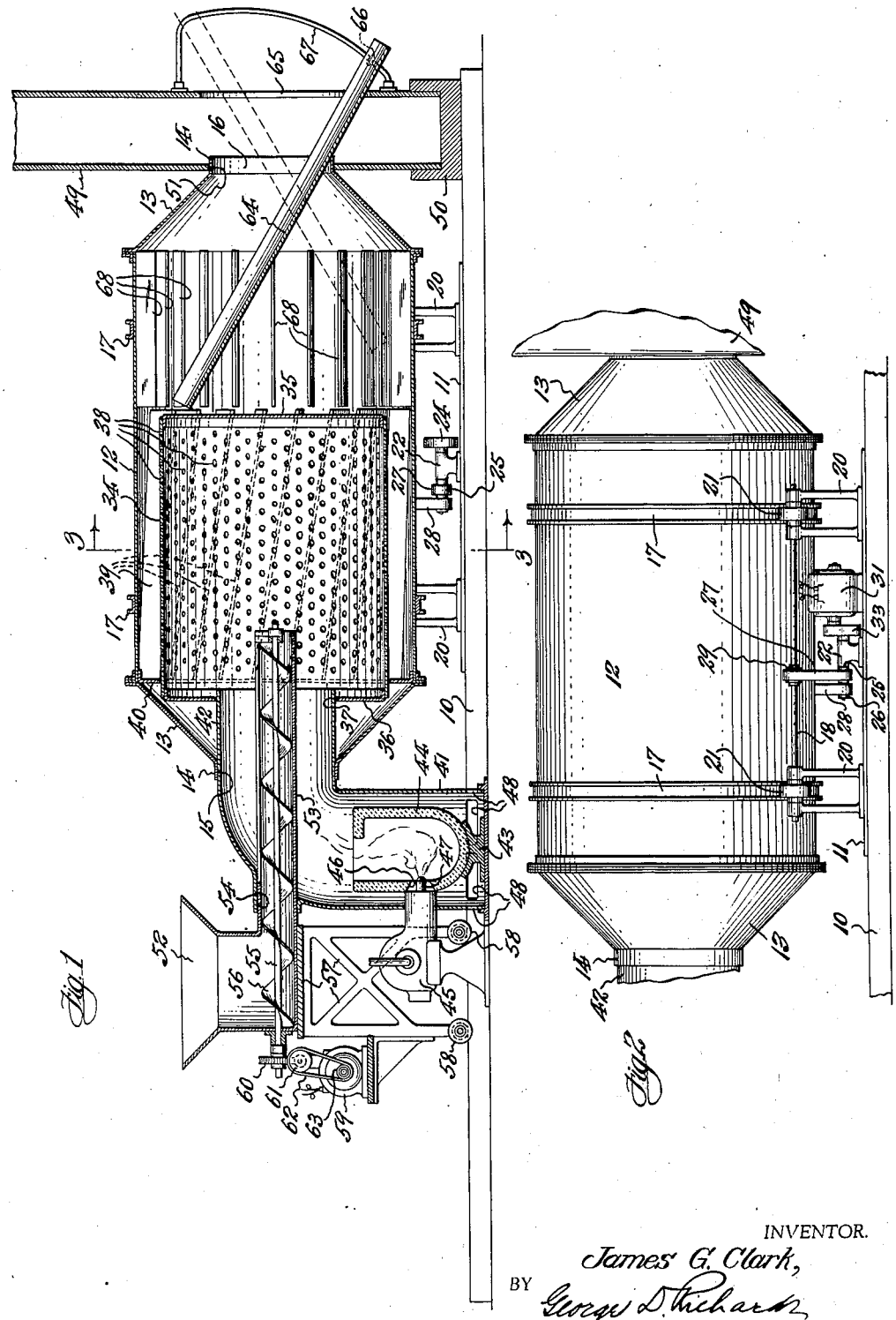
INVENTOR.
James G. Clark,
BY George D. Richards
ATTORNEY.

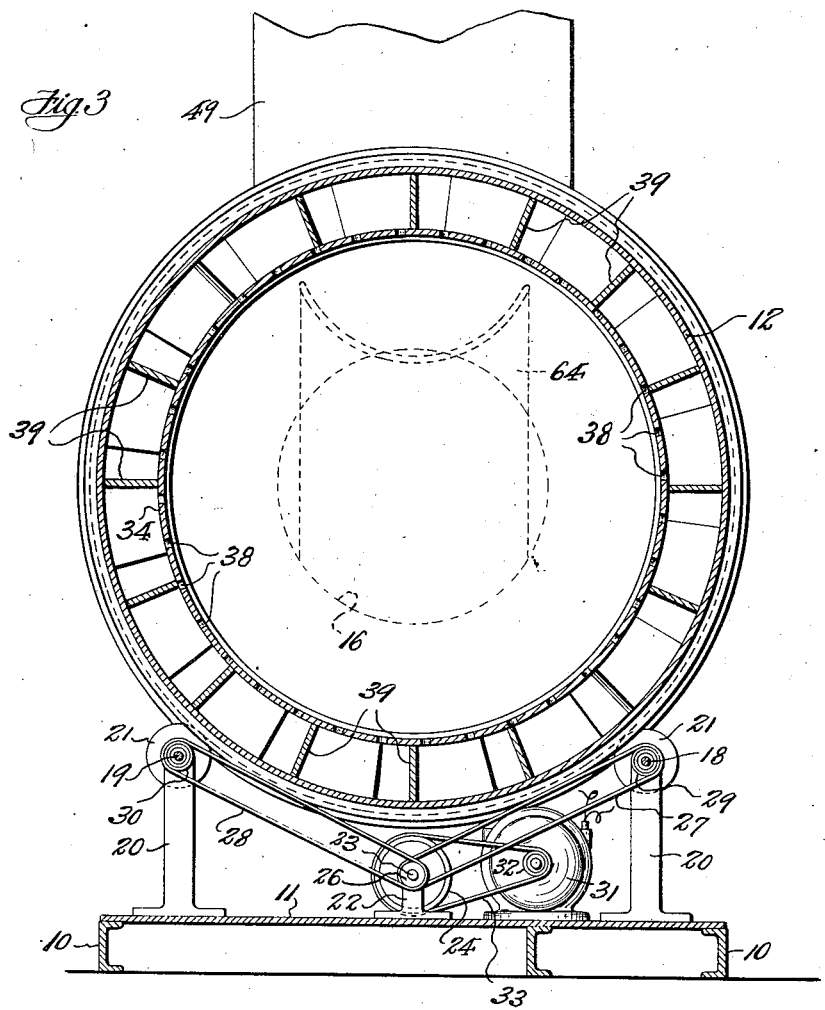

Patented May 27, 1941

2,243,192

UNITED STATES PATENT OFFICE 2,243,192

MANURE DEHYDRATOR

James G. Clark, Newark, N. J.

Application June 28, 1939, Serial No. 281,507

3 Claims. (Cl. 263—19)

This invention relates, generally, to dehydrating apparatus; and the invention has reference, more particularly, to improvements in apparatus adapted for drying and disintegrating manures, and especially for so treating poultry manure.

The disposal of manure has long been an annoying problem for poultry raisers, and yet, when properly processed, such manure contains the basic elements for producing a well-balanced commercial fertilizer, and, for this reason, can well be converted into a profitable by-product of the poultry farm, while at the same time ridding the farm accumulations of raw manure, which is well known to be a nasty, unsanitary, and unsaleable product.

Having these things in mind, it is an object of this invention to provide a simple, efficient and cheaply operated apparatus for reducing raw manure (which contains from 60 to 75% water) by applied heat and agitation, to a dry and comparatively finely divided state, whereby the same is converted into a well balanced plant fertilizing food, readily adapted to enter into and mix with the soil desired to be fertilized thereby. The heat applied in the operating of the novel apparatus also serves to kill germs, weed seeds and spores contained in the manure, the presence of which in the resultant fertilizer would be detrimental.

The invention has for another object to provide a dehydrator apparatus for the purposes stated, and for other purposes for which it may be adapted, wherein a rotary kiln is provided at one end with an interior perforate receiving and tumbling drum into which the material to be operated upon is served by a delivery conveyer means, means being provided for supplying heat to and through the interiors of the drum and kiln, and said kiln having means to move the dried and disintegrated manure to its other end for discharge therefrom.

The invention has for another object to provide a novel discharge chute means cooperative with the discharge end of the kiln, said chute means being selectively disposable in a service or out-of-service position, and said kiln having means for picking up and transferring the dried and disintegrated manure to the inner receiving end of said chute means.

Other objects of this invention, not at this time more particularly enumerated, will be understood from the following detailed description of the same.

An illustrative embodiment of the invention is shown in the accompanying drawings, in which—

Fig. 1 is a vertical longitudinal sectional view through the dehydrator apparatus made according to this invention; Fig. 2 is a fragmentary side elevation of a portion of said apparatus; and Fig. 3 is a vertical cross section through the same, taken on line 3—3 in Fig. 1, but drawn on an enlarged scale.

Similar characters of reference are employed in the above-described views, to indicate corresponding parts.

Referring to the drawings, the reference character 10 indicates a pair of laterally spaced longitudinal base rails, across which, at a suitable location, extends a deck plate 11, or other suitable supporting means for the carrying and driving mechanism of the rotary kiln member of the apparatus. Said rotary kiln member comprises a cylindrical body 12 having truncated conical end members 13 terminating in axially extending circular flanges 14 bounding the end openings provided thereby; one of said openings, as 15, constituting a rear end opening, and the other constituting a front end or discharge opening 16. Externally affixed to and around said kiln body, respectively adjacent to the respective ends thereof, are channeled track rings 17.

The means for supporting and rotating the kiln body comprises a pair of longitudinally extending laterally spaced parallel shafts 18 and 19, which are journaled in bearing standards 20 suitably supported, as e. g. upon the deck plate 11 bridged across the base rails 10. Fixed on said shafts are driving rollers 21 which engage in the track rings 17, whereby rotary movement of said rollers imparts a rotary movement to the kiln body about its longitudinal axis.

Suitable power transmission means is provided for driving the shafts 18, 19 and the rollers 21 carried thereby. An illustrative form of such transmission means comprises, a suitably located bearing standard 22 affixed to said deck plate 11, and in which is journaled a counter shaft 23. Affixed on said shaft 23 is a large pulley 24, and also affixed on said shaft 23 are drive pulleys 25 and 26 which respectively drive, through the respective driving belts 27 and 28, the driven pulleys 29 and 30 which are respectively affixed on said respective shafts 18 and 19. Power from a suitable source is applied to said large pulley 24. For example, an electric motor 31 is provided and mounted on the deck plate 11, its armature shaft having a drive pulley 32 operatively connected with said large pulley 24 by a transmission belt 33. It will be understood that there are many other kinds of transmission means capable of use for transmitting kiln operating power to the shafts 18 and 19 and their kiln driving rollers 21, and which may be used without departing from the scope of this invention.

Fixed within the forward interior end portion of the kiln body 12 is a cylindrical tumbling drum 34 of reduced diameter disposed concentric thereto. This tumbling drum is closed at its forward end by an imperforate end wall 35, and is likewise closed at its rearward end by an end wall 36 having a central opening 37. The cylindrical wall of said tumbling drum is perforated by a multiplicity of openings 38 leading outwardly from its interior to the annular space intermediate the same and the spaced surrounding cylindrical wall of the kiln member 12. Arranged in said annular intermediate space, to extend therethrough to a point approximately adjacent to the forward end of said tumbling drum, are a series of circumferentially spaced radial longitudinally oblique flights 39. The spaces defined by these flights 39 are preferably closed at their rearward ends by an annular portion ring 40, so as to prevent trapping of material, discharged from the drum, within the kiln interior beyond the rearward end of said drum.

Means for supplying heat to the interiors of said tumbling drum 34 and of said kiln member 12 is provided. This means comprises a housing 41 located adjacent to the rearward end of said kiln member 12, said housing terminating at its upper end in a cylindrical forwardly projecting extension 42 sized to fit and extend through the rear end opening 15 of said kiln member, and thence forwardly through the opening 37 of the rear end wall 36 of the tumbling drum 34, so as to terminate within the interior of the latter. Mounted on suitable support 43 within said housing 41 is an upwardly open combustion chamber or fire-box 44 made of a suitable refractory material. Mounted adjacent to said housing 41 is an oil burner mechanism 45, the discharge end of which extends through a wall of said housing into engagement with an opening 46 in the side of said combustion chamber or fire-box 44; through which opening 46, the burner jet 47 of said oil burner mechanism 45, when ignited, discharges into the interior of said combustion chamber or fire-box, the products of the combustion of fuel burned by said oil burner mechanism. Provided in the lower end of said housing 41 are air intake passages or ports 48, whereby air is admitted to the housing for admixture with the products of combustion emitted from the combustion chamber or fire-box 44, to thereby furnish hot gases for introduction and flow through the tumbling drum 34 and kiln body 12.

Supported adjacent to the forward end of said kiln body 12 is an upstanding stack 49, supported by a suitable footing means 50 mounted in connection with the base rails 10. Said stack is provided in its rearward wall with an opening 51 into which extends the circular flange 14 which bounds the discharge opening 16 of the kiln body, whereby communication is established between the interior of the latter and the interior of said stack.

Means are provided for delivering manure to be dehydrated and distintegrated into the interior of the tumbling drum 34. In a preferred form thereof, this means comprises, a receiving hopper 52, from the lower end of which extends a forwardly projecting conveyer trough 53. This conveyer trough 53 is disposed to enter through an opening 54 provided in the extension 42 of said housing 41, so as to pass axially therethrough, and thence into the interior of the tumbling drum 34, to terminate within the rearward end portion of the latter. Mounted in connection with said hopper 52 and conveyer trough 53, so as to extend therethrough, is the shaft 55 of a rotatable helical or screw-type conveyer 56, which, when operated, moves the manure delivered into said hopper 52 forwardly through said trough 53, so as to discharge the same from the latter into the interior of the tumbling drum 34. Preferably said hopper and conveyer trough are mounted on a movable carriage 57 provided with traction wheels 58 adapted to move on and be guided by said base rails 10, whereby the hopper and conveyer trough may be arranged for withdrawal from operative relation to the kiln body 12 and tumbling drum 34 at will. The conveyer trough is preferably open along the top side of its forwardly extending portion, so that, when withdrawn from operative relation to the kiln body and tumbling drum, access to the interior thereof may be had for cleaning the same, or for other desired purpose. Any suitable means may be provided for actuating the conveyer 56. Preferably such means comprises an electric motor 59, suitably supported by a bracket extension 60 provided in connection with said carriage 57. A suitably supported worm and gear transmission means 60, adapted to be driven by a pulley 61 and belt 62 from the motor shaft pulley 63, imparts desired operative movement to the shaft 55 of said conveyer 56. Any other suitable means for driving the conveyer 56 may be employed, however, without departing from the scope of this invention.

In the operation of the dehydrator apparatus, the hopper and conveyer trough being moved into operative relation to the kiln member, the wet manure deposited in the hopper 52 is engaged by the actuated conveyer 56 and moved forwardly through the conveyer trough 53, so as to be discharged therefrom into the interior of the tumbling drum 34. The kiln body 12 and the tumbling drum 34 are caused to revolve by the driving mechanism serving the same, while at the same time the ignited oil burner discharges burning fuel into the combustion chamber 44. Under the draft produced by the stack 49, the products of combustion are drawn from the combustion chamber into the housing 41 and admixed with air admitted into the latter through the ports 48, thus producing a hot gaseous mixture which is delivered through the housing extension 42 into the interior of the tumbling drum 34, and thus in contact with the wet manure being tumbled about within the latter. Said hot gaseous mixture passes outwardly from the tumbling drum through the openings 38 thereof into the interior of the kiln member 12, being caused to flow therefrom through the discharge opening 16 and thence upwardly through the stack 49.

As the wet manure is tumbled about in the interior of the drum 34 in the presence of the hot gases passing therethrough, the moisture content thereof is driven off, and the agitation produced by the tumbling movement operates to disintegrate the manure masses, so as to reduce the same to a substantially dry and coarse powdery condition. As such condition is attained, the manure particles may and will pass outwardly through the openings 38 of the tumbling drum wall, and thence into the annular space intermediate the drum and the walls of the kiln body 12. Since the latter space is occupied by the longitudinally oblique or inclined radial flights 39, the emitted manure is caused, by operation of said flights, to move forwardly beyond the tumbling drum and into the open forward interior portion of the kiln body 12, preparatory to discharge from the apparatus.

Means are provided for automatically discharging the dehydrated and disintegrated manure from the apparatus. This means comprises a discharge chute 64, with means for so mounting the same that it extends from the forward interior portion of the kiln body 12 outward through the discharge opening 16 of the latter, and thence across the interior of the stack 49 through an opening 65 provided in the outer wall of the latter. The outer end portion of said chute is movably supported at its sides by slide rings 66, or other suitable connecting means, upon curvilinear guide rod brackets 67 which are secured to and which project from the outer wall of said stack 49. When the outer end portion of the chute 64 is slid downward on the guide rods 67, the chute is rocked longitudinally to a position wherein its inner end is elevated within the kiln body interior, thus causing the chute to incline downwardly and outwardly therefrom, so as to discharge the dried manure delivered onto its inner end portion. To pick up the dried manure from the kiln body interior and deliver the same into the elevated receiving end of the chute 64, a series of axially parallel radial flights 68 are secured to and around the kiln body walls. These flights, under the revolving movement of the kiln body, during their upward or rising movement pick up the manure, and as they are carried above and across the chute drop or discharge said manure onto the chute, whereupon the manure slides downwardly through the latter for discharge from the exterior end of the chute into such receiving containers or receptacles as may be desired to be loaded therewith.

If it should be desired to stop discharge of the dried and disintegrated manure for any reason, such e. g. as shifting of receiving containers, or to allow a dwell of the material in the kiln body interior for a longer period than results from normal discharge under continuous or uninterrupted operation, then the outer end portion of the chute 64 may be slid upwardly on the guide rods 67, to the dotted position indicated by broken lines in Fig. 1, in which position, the inner end of the chute is downwardly and inwardly inclined, so as to return any manure received thereby back to the bottom of the kiln body.

It will be obvious that the dehydrator apparatus may be operated in a substantially continuous manner or in intermittent manner as may be at any time desirable. Suitable control of the speed of operation of the feeding conveyer and of the kiln body, will govern the time factor so that the manure under treatment may be caused to move through the apparatus at the rate of speed best calculated to produce the degree of dryness desired.

I am aware that many changes could be made in the apparatus above described and shown in the accompanying drawings, and many apparently widely different embodiments of this invention could be made without departing from the scope thereof as defined by the following claims. It is therefore intended that all matter contained in the above description or shown in the accompanying drawings shall be interpreted as illustrative and not in a limiting sense.

I claim:

1. Dehydrator apparatus comprising, a kiln body mounted to rotate about its longitudinal axis, means to drive said body, a perforate tumbling drum of less length than said kiln body fixed within the rearward interior portion thereof in concentric spaced relation to the side walls thereof; a fuel combustion means including a housing having an elbow extension to enter through the rearward end of said kiln body and through the rear end wall of said tumbling drum for communication with the interior of the latter, an upwardly open combustion chamber of refractory material mounted within said housing in spaced relation to the walls of the latter to provide a surrounding ingoing air passage, an oil burner adapted to discharge burning fuel into said combustion chamber, and said housing having air intake means below said combustion chamber for supplying air through said air passage for admixture with the hot products of combustion discharged from said combustion chamber to thereby form a large volume of hot gaseous mixture for delivery to said tumbling drum interior; a draft creating stack with which the forward discharge end of said kiln body communicates and through which said hot gaseous mixture is discharged; means to deliver material to be treated into said tumbling drum; circumferentially spaced longitudinally oblique radial flights fixed between the kiln body side walls and said tumbling drum whereby material emitted from the latter is shifted beyond the tumbling drum into the forward interior portion of said kiln body, and means for discharging the treated material from said forward interior portion of said kiln body.

2. Dehydrator apparatus comprising, a kiln body mounted to rotate about its longitudinal axis, means to drive said body, a perforate tumbling drum of less length than said kiln body fixed within the rearward interior portion thereof in concentric spaced relation to the side walls thereof; a fuel combustion means including a housing having an elbow extension to enter through the rearward end of said kiln body and through the rear end wall of said tumbling drum for communication with the interior of the latter, an upwardly open combustion chamber of refractory material mounted within said housing in spaced relation to the walls of the latter to provide a surrounding ingoing air passage, an oil burner adapted to discharge burning fuel into said combustion chamber, and said housing having air intake means below said combustion chamber for supplying air through said air passage for admixture with the hot products of combustion discharged from said combustion chamber to thereby form a large volume of hot gaseous mixture for delivery to said tumbling drum interior; a draft creating stack with which the forward end of said kiln body communicates and through which said hot gaseous mixture is discharged; means to deliver material to be treated into said tumbling drum; circumferentially spaced longitudinally oblique radial flights fixed between the kiln body side walls and said tumbling drum whereby material emitted from the latter is shifted beyond the tumbling drum into the forward interior portion of said kiln body, said forward interior portion of said kiln body having axially parallel straight radial flights spaced around its walls, and a pivoted discharge chute adapted to be optionally disposed in downwardly and inwardly inclined non-discharging position or in downwardly and outwardly inclined extension from the kiln body interior and thence across and exteriorly of said stack.

3. In dehydrator apparatus as defined in claim 2, including arcuate chute guide and support means affixed to and exteriorly of said stack, and means on the outer end portion of said chute to cooperate with said guide and support means.

JAMES G. CLARK.